UNITED STATES PATENT OFFICE.

JAMES CHATTAWAY, OF SPRINGFIELD, MASSACHUSETTS.

IMPROVED WATER-PROOF PERCUSSION-CAP.

Specification forming part of Letters Patent No. 15,063, dated June 10, 1856.

*To all whom it may concern:*

Be it known that I, JAMES CHATTAWAY, in the county of Hampden, State of Massachusetts, have invented a new and Improved Mode of Making Percussion-Caps Water-Proof; and I do hereby declare that the following is a full and exact description thereof.

The nature of my invention consists in placing a piece of metal over the powder in each cap, and then place upon said piece of metal a piece of alloy or solder composed of bismuth, lead, and tin, which will fuse at a given heat, (insufficient to explode the powder,) by which fusion a complete soldering of the edges of the piece of metal covering the powder is effected to the sides or body of the caps, rendering them entirely impervious to water, dampness, or any change of weather.

What I claim as my invention, and desire to secure by Letters Patent, is—

The application to percussion-caps of a fusible alloy which will melt without exploding the powder, as herein described, using for that purpose the aforesaid metallic compound or any other substantially the same, and which will produce the intended effect.

JAMES CHATTAWAY.

Attest:
E. D. BEACH,
GEO. H. KNAPP.